US010462309B2

(12) United States Patent
Zakharov

(10) Patent No.: US 10,462,309 B2
(45) Date of Patent: Oct. 29, 2019

(54) SYSTEM AND METHOD FOR DIAGNOSING A PRINTING DEVICE BASED ON A CORRELATION COEFFICIENT BETWEEN PRINT VOLUME AND ERROR RATE

(71) Applicant: KYOCERA Document Solutions Inc., Osaka (JP)

(72) Inventor: Oleg Y. Zakharov, Walnut Creek, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/853,319

(22) Filed: Dec. 22, 2017

(65) Prior Publication Data

US 2019/0199863 A1 Jun. 27, 2019

(51) Int. Cl.
*H04N 1/00* (2006.01)
(52) U.S. Cl.
CPC ..... *H04N 1/00029* (2013.01); *H04N 1/00015* (2013.01); *H04N 1/00018* (2013.01); *H04N 1/00068* (2013.01); *H04N 1/0005* (2013.01); *H04N 1/00079* (2013.01)
(58) Field of Classification Search
USPC ................. 358/1.1–3.29, 1.11–1.18
See application file for complete search history.

(56) References Cited

U.S. PATENT DOCUMENTS

| 5,715,496 A | * | 2/1998 | Sawada ............... G06F 11/0733 399/10 |
| 2012/0176640 A1 | * | 7/2012 | Furukawa ............ B41J 2/16579 358/1.14 |
| 2012/0294631 A1 | | 11/2012 | Burry et al. |
| 2013/0163032 A1 | * | 6/2013 | Hamano ............... G06F 3/1296 358/1.14 |
| 2015/0227100 A1 | * | 8/2015 | Uwatoko ............... G03G 15/55 399/9 |
| 2017/0171400 A1 | * | 6/2017 | Zakharov ........... H04N 1/00042 |

FOREIGN PATENT DOCUMENTS

JP 2009206850 A 9/2009

* cited by examiner

*Primary Examiner* — Marcellus J Augustin
(74) *Attorney, Agent, or Firm* — Weiss & Moy, P.C.; Jeffrey D. Moy

(57) ABSTRACT

A method to determine an operating status of an image forming device comprises: monitoring a plurality of operating parameters of the image forming device during a first time interval; calculating a correlation coefficient during a second time interval between at least two of the plurality of operating parameters; identifying the image forming device as an abnormal operating status when the correlation coefficient calculated during the second time interval is a positive correlation coefficient above a predetermined level associated with a model of the image forming device; and determining a maintenance action for the image forming device based on the abnormal operating status.

18 Claims, 8 Drawing Sheets

FIG. 5

| Device 001, Model A | | |
|---|---|---|
| DATE | PRINT | ERROR RATE |
| Day 1 | 200 | 1 |
| Day 2 | 250 | 1 |
| Day 3 | 300 | 2 |
| Day NN | 350 | 4 |

| Device 002, Model A | | |
|---|---|---|
| DATE | PRINT | ERROR RATE |
| Day 1 | 200 | 1 |
| Day 2 | 200 | 2 |
| Day 3 | 300 | 2 |
| Day NN | 350 | 3 |

FIG. 7

Device 001, Model A

| Analytical Time Interval<br>ATI | Number of data sampling | Total printed pages<br>$P(ti)$ | Total number of errors<br>$Err(ti)$ | Correlation Coefficient<br>$CORR(PV, ERR)$ |
|---|---|---|---|---|
| ... | | ... | ... | ... |
| ATI 1 | 7 | 5,000 | 10 | 0.1 |
| ATI 2 | 7 | 20,000 | 5 | -0.3 |
| ATI 3 | 7 | 10,000 | 20 | 0.7 |
| ... | | ... | ... | ... | ns
SYSTEM AND METHOD FOR DIAGNOSING A PRINTING DEVICE BASED ON A CORRELATION COEFFICIENT BETWEEN PRINT VOLUME AND ERROR RATE

TECHNICAL FIELD

The present application in general relates to printing devices, and more specifically, to a system and method for diagnosing an image forming device based on a correlation coefficient between print volume and error rate.

BACKGROUND

In order to properly maintain image forming devices such as printers, copiers, facsimile, and multi-function peripherals, remote management systems have been designed to collect various items of management information, such as maintenance management information, working state and failure information of the image forming devices. Most remote management systems are network based. Thus, most image forming devices may be coupled to a communication network so that the connection between the image forming devices and a central management device is established via the network.

The monitoring server may collect information regarding the image forming device such as the number and kind of prints the image forming device has performed and other aspects of its current state and/or operation. This information may be stored so that historical records of incidents that occur for the image forming device may be maintained. An incident may include a hardware or software issue.

The image forming device needs to be available for normal operations, such as printing, scanning, copying and other functions, for as long as possible with a minimum number of errors. With the printing function, it is desirable for the image forming device to produce print volume as efficiently as possible. When the image forming device is in a good operating status, it produces high print volume with minimum errors. If the image forming device has one or more parts with degradation or operating problems, the number of errors correlates with print volume. For instance, if a paper feeder has a mechanical problem, then the rate of paper jams will depend on number of printed pages.

Diagnostics of problematic image forming devices may be developed based on information about the amount of errors monitored and the number of pages printed. A maximum number of accepted errors may be predetermined by manufacturer specification for each device model. For instance, a maintenance specification can determine a normal failure rate as Mean Time Between Failure (MTBF), which equals one thousand pages between paper jams as a threshold. In a simple exemplary case, if only one jam error happens every 1,000 printed pages—the image forming device may be associated with a normal operating status.

NORMAL OPERATING STATUS: MTBF>1,000 pages;

Otherwise, the maintenance service should be scheduled for this printing device if jam happened more frequently than one thousand pages:

ABNORMAL OPERATING STATUS: MTBF<1,000 pages;

The value of MTBF can vary for different device models and different types of maintenance (service) contracts. For instance, device model 'Venus1' can be associated with MTBF=3,000 pages, while model 'Mercury1' can have MTBF=5,000 pages.

Method of diagnosis, symptoms and criteria of diagnostics can vary for different types of errors: mechanical errors as paper jams have different criteria of diagnostics, compared to software errors. Software or firmware errors mostly relate to network problems, user settings and image quality. Software/firmware errors have little correlation with printer's print volume, while mechanical failure directly relates to printer's print volume and is caused by degradation of mechanical parts. In cases when the image forming device has hardware issues, a service technician can schedule maintenance work that includes: parts cleaning, parts replacement and/or replacing entire device with new model for customer satisfaction.

A mathematical correlation function builds a numerical coefficient that reflects similarity of two series of variables, or measures similarity in terms of increasing and decreasing values of two variables. If the similarity is high, then the two variables are dependent. For example, if both variables increase and decrease in value synchronously, the correlation and dependency between these two variables is high. A correlation coefficient between print volume and failure rate can be an indicator of a good or bad operating status of the printing device, and it can be used as an indication of necessary service or maintenance work.

Therefore, it would be desirable to provide a system and method to diagnose image forming devices based on a correlation coefficient between print volume and error rate.

SUMMARY

In accordance with one embodiment, a method to determine an operating status of an image forming device is disclosed. The method comprises: monitoring a plurality of operating parameters of the image forming device during a first time interval; calculating a correlation coefficient between at least two of the plurality of operating parameters monitored during a second time interval; identifying the image forming device as an abnormal operating status when the correlation coefficient calculated during the second time interval is a positive correlation coefficient above a predetermined level associated with a model of the image forming device; and determining a maintenance action for the image forming device based on the abnormal operating status.

In accordance with one embodiment, a method to determine an operating status of at least one image forming device is disclosed. The method comprises: monitoring a plurality of operating parameters of the at least one image forming device during a first time interval, wherein monitoring a plurality of operating parameters of at least one image forming device comprises: determining a total number of pages printed by the at least one image forming device during the first time interval; and determining a total number of errors recorded by the at least one image forming device during the first time interval; calculating a correlation coefficient of the at least one image forming device during a second time interval; identifying the at least one image forming device as an abnormal operating status when the correlation coefficient is a positive correlation coefficient above a predetermined threshold level associated with a model of the at least one image forming device; and determining a maintenance action for the desired image forming device based on the abnormal status.

In accordance with one embodiment, a system for indicating normal and abnormal operating conditions for an image forming device is disclosed. The system has a processor. A memory is coupled to the processor. The memory stores program instructions that when executed by the processor, causes the processor to: monitor a plurality of operating parameters of the image forming device during a first time interval by determining a total number of pages printed and a total number of errors recorded during the first time interval; calculate a correlation coefficient between the plurality of operating parameters during a second time interval; identify the image forming device as an abnormal operating status when the correlation coefficient calculated during the second time interval is a positive correlation coefficient above a predetermined level associated with a model of the image forming device; and determine a maintenance action for the image forming device based on the abnormal operating status.

BRIEF DESCRIPTION OF THE DRAWINGS

The present application is further detailed with respect to the following drawings. These figures are not intended to limit the scope of the present invention but rather illustrate certain attributes thereof.

FIG. 5 is an exemplary embodiment of a chart showing a set of data collected by the monitoring system of FIG. 1 according to one aspect of the present application;

FIG. 7 is an exemplary embodiment of a chart showing analytical time intervals with calculated correlation coefficients using the monitoring system of FIG. 1 according to one aspect of the present application.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary system and method relates to a system and method for diagnosing image forming devices based on a correlation coefficient between print volume and error rate wherein data related to print volume and error rate are collected during a data sampling interval. The system and method may calculate a correlation coefficient at the end of each analytical time interval. Observation of a trend and/or changes in correlation coefficients during sequential analytical time intervals may be used as a basis for diagnosing an operating condition of the image forming device. If correlation coefficient increases in value and exceeds a predetermined threshold, the image forming device may be marked as having a certain level of degradation and maintenance work can be scheduled.

Figure 1:
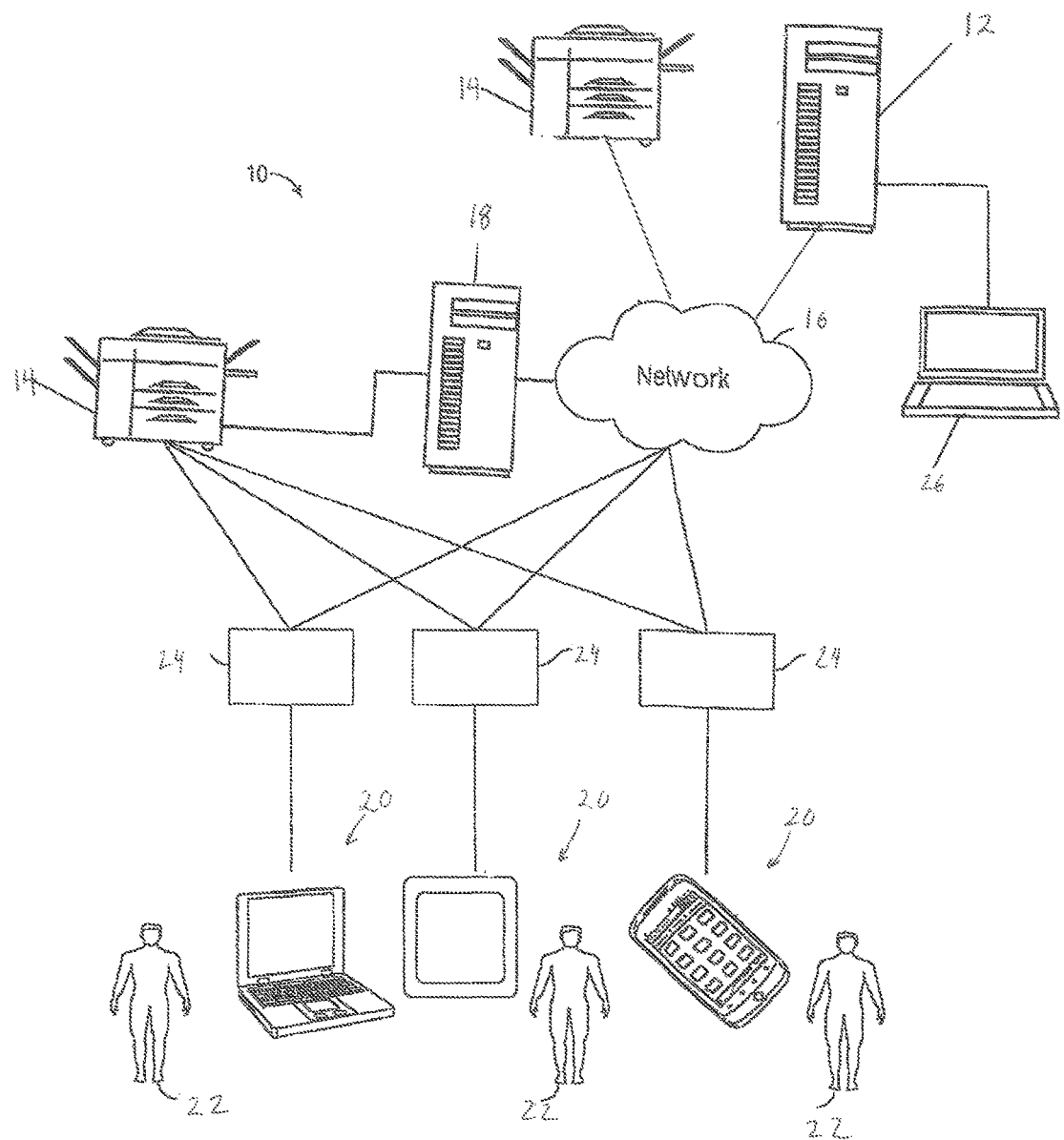
FIG. 1 is a diagram of an exemplary monitoring system according to one aspect of the present application.

Referring now to FIG. 1, a system 10 (hereinafter system 10) may be shown. The system 10 may have a monitoring server 12. The monitoring server 12 may be coupled to one or more image forming devices 14. The monitoring server 12 may be coupled directly to the image forming device 14 through a network 16 or may be coupled to the image forming device 14 through a print server 18 and the network 16.

The image forming device 14 may be any type of device having printing capabilities. For example, the image forming device 14 may be a printer, a copier, a fax machine, a multi-function peripheral including a scanner and one or more of functions of a copier, a facsimile device, and a printer and/or other types of rendering devices. The image forming device 14 may be used for outputting a print job.

The print server 18 may be used to connect the image forming device 14 to one or more computing devices 20 over the network 16. The network 16 may be a local area network (LAN), a general wide area network (WAN), wireless local area network (WLAN) and/or a public network. The print server 18 may accept print jobs from the computing device 20 and may send the print jobs to the appropriate image forming device 14. The print server 18 may queue the jobs locally as print jobs may arrive more quickly than the image forming device 14 may be able to print. Alternatively, or in addition to, the computing device 20 may be directly coupled to the image forming device 14.

Individuals 22 may use one or more computing devices 20 to send print jobs to the image forming device 14 via a printing application 24 loaded on the computing device 20. The computing devices 20 may send the print jobs directly to the image forming device 14 or through the print server 18. The computing devices 20 may be a client computer system such as a desktop computer, handheld or laptop device, tablet, mobile phone device, server computer system, multiprocessor system, microprocessor-based system, network PCs, and distributed cloud computing environments that include any of the above systems or devices, and the like. The computing device 20 may be described in the general context of computer system executable instructions, such as program modules, being executed by a computer system as may be described below.

The system 10 may have a monitoring server 12. The monitoring server 12 may be coupled to the one or more image forming devices 14. The monitoring server 12 may be coupled directly to the image forming devices 14 through the network 16 or may be coupled to the image forming devices 14 through the print server 18 and the network 16. The monitoring server 12 may be used to monitor and record a plurality of different operating parameters related to the operation of the image forming devices 14. The information may be error alerts, print volume, and the like. Error alerts may contain information relating to an issue being experienced by the image forming device 14. The error alert may contain information such as, but not limited to: an error code relating to the type of error, location of the error, time of the error as well as other information pertaining to the error.

Figure 2:
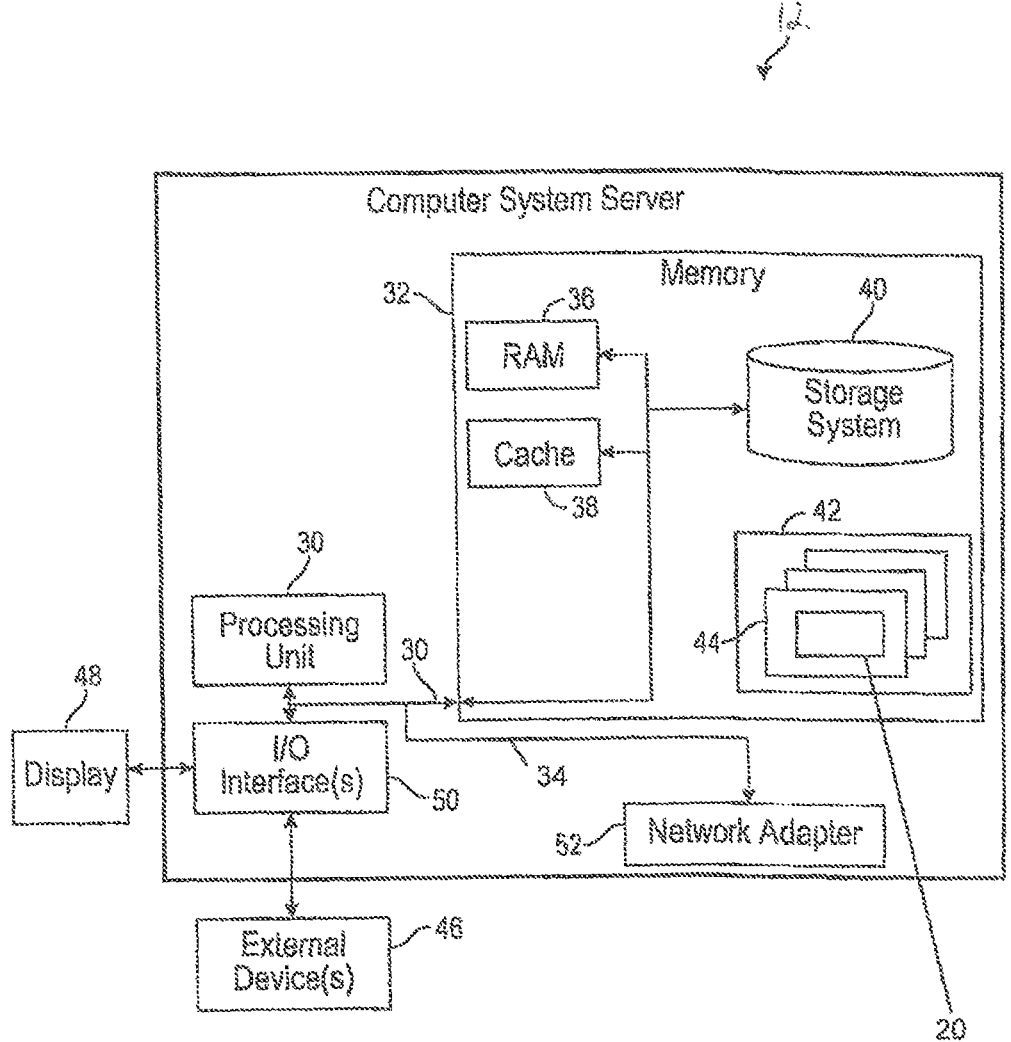
FIG. 2 is a simplified block diagram showing an illustrative server device depicted in FIG. 1 in accordance with one aspect of the present application.

This information may be sent directly from the image forming device 14 or from the print server 18. The monitoring server 12 may calculate a correlation coefficient between the error alert and the print volume during predetermined time intervals. The correlation coefficient may be used as an indicator of the operational health of the image forming device as will be described below. If the correlation coefficient increases in value, it can trigger an indicator that the image forming device 14 has a certain level of degradation and the monitoring server 12 may signal the service computing device 26 to schedule maintenance work Referring now to FIG. 2, monitoring server 12 may be described in more detail in terms of the machine elements that provide functionality to the systems and methods disclosed herein. The components of the monitoring server 12 may include, but are not limited to, one or more processors or processing units 30, a system memory 32, and a system bus 34 that couples various system components including the system memory 32 to the processor 30. The monitoring server 12 may typically include a variety of computer system readable media. Such media may be chosen from any available media that is accessible by the monitoring server 12, including non-transitory, volatile and non-volatile media, removable and non-removable media. The system memory 32 could include one or more personal computing system readable media in the form of volatile memory, such as a random access memory (RAM) 36 and/or a cache memory 38. By way of example only, a storage system 40 may be provided for reading from and writing to a non-removable, non-volatile magnetic media device typically called a "hard drive".

The system memory 32 may include at least one program product/utility 42 having a set (e.g., at least one) of program modules 44 that may be configured to carry out the functions of embodiments of the invention. The program modules 44 may include, but is not limited to, an operating system, one or more application programs, other program modules, and program data. Each of the operating systems, one or more application programs, other program modules, and program data or some combination thereof, may include an implementation of a networking environment. The program modules 44 generally carry out the functions and/or methodologies of embodiments of the invention as described herein. For example, a program module 44 in the monitoring server 12 may be configured to calculate a correlation coefficient between the error alert and the print volume during predetermined time intervals. The correlation coefficient may be used as an indicator of the operational health of the image forming device as will be described below.

The monitoring server 12 may communicate with one or more external devices 46 such as a keyboard, a pointing device, a display 48, or any similar devices (e.g., network card, modem, etc.). The display 48 may be a Light Emitting Diode (LED) display, Liquid Crystal Display (LCD) display, Cathode Ray Tube (CRT) display and similar display devices. The external devices 46 may enable the monitoring server 12 to communicate with the image forming device 14 (FIG. 1), a service computing device 26 (FIG. 1) or other devices. Such communication may occur via Input/Output (I/O) interfaces 50. Alternatively, the monitoring server 12 may communicate with one or more networks 16 (FIG. 1) such as a local area network (LAN), a general wide area network (WAN), and/or a public network via a network adapter 52. The monitoring server 12 may be coupled to the one or more networks via a wired or wireless connection. As depicted, the network adapter 52 may communicate with the other components via the bus 34.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 40) may be utilized. In the context of this disclosure, a computer readable storage medium may be any tangible or non-transitory medium that can contain, or store a program (for example, the program product 42) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Figure 3:
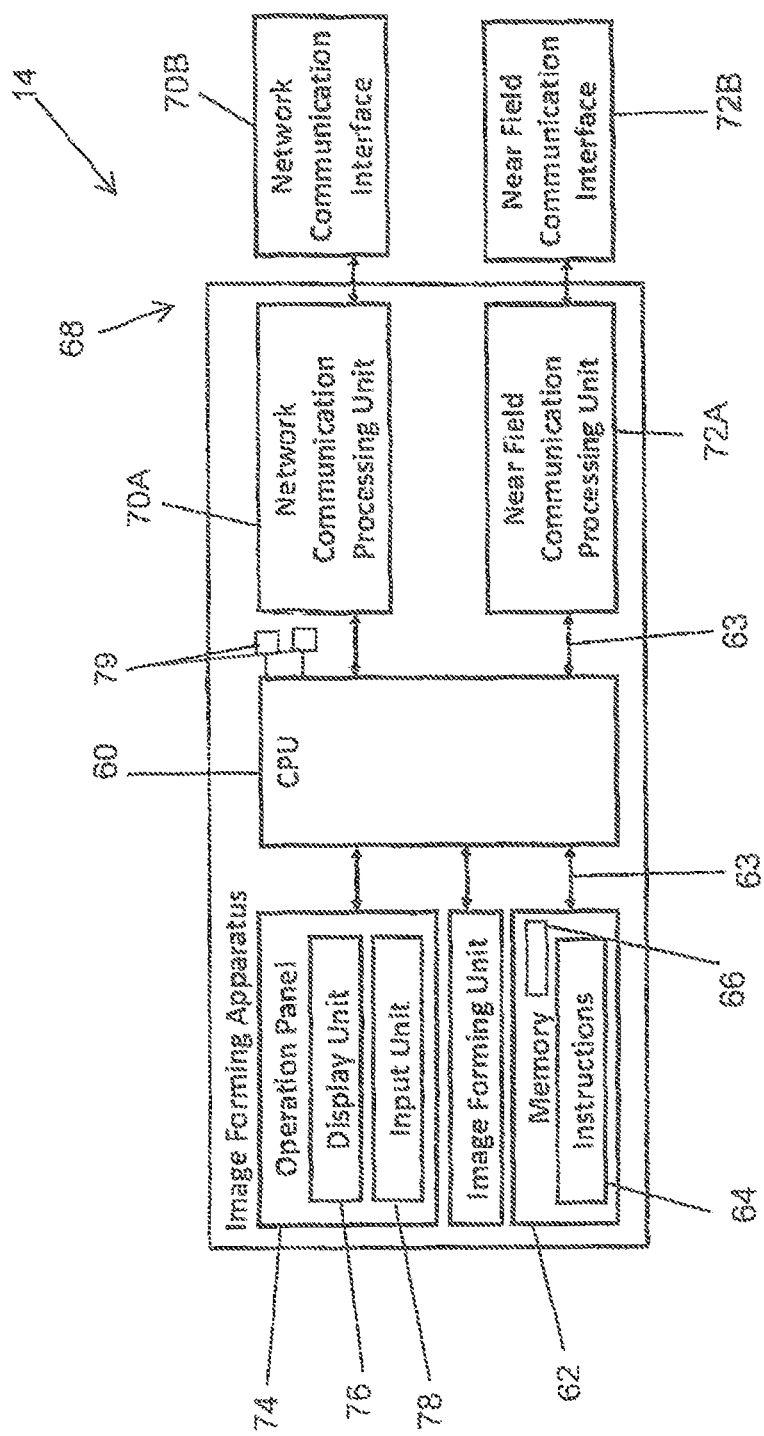
FIG. 3 is a simplified block diagram showing an illustrative image forming device depicted in FIG. 1 according to one aspect of the present application.
Figure 4:
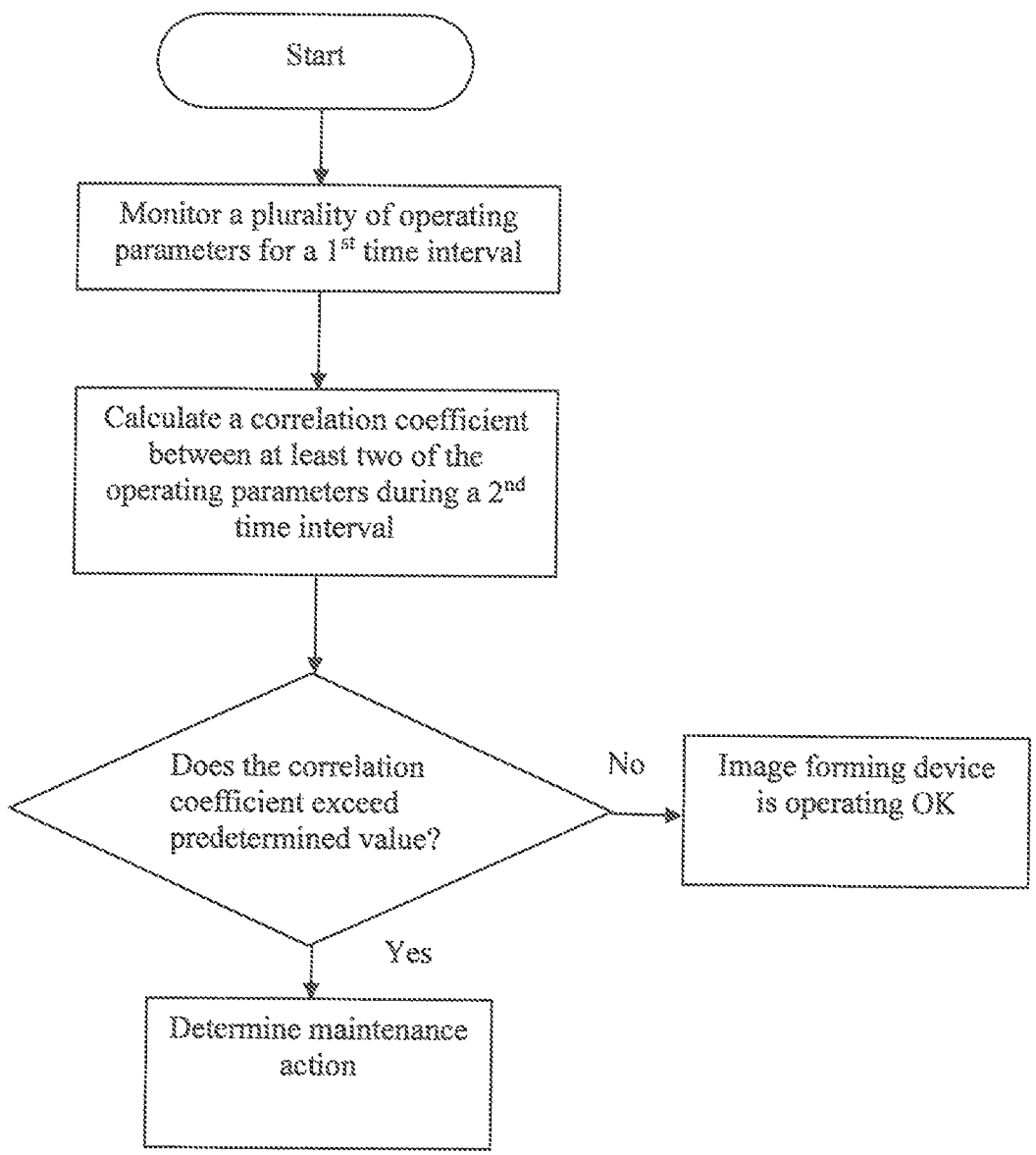
FIG. 4 is an exemplary embodiment of a flowchart depicting a method for diagnosing an image forming device based on a correlation coefficient between print volume and error rate according to one aspect of the present application.

Referring now to FIG. 3, the image forming device 14 may be described in more detail in terms of the machine elements that provide functionality to the systems and methods disclosed herein. The components of the image forming device 14 may include, but are not limited to, one or more processors or processing units 60, a system memory 62, and a system bus 63 that may couple various system components including the system memory 62 to the processor 60. The image forming device 14 may typically include a variety of computer system readable media. Such media could be chosen from any available media that is accessible by the image forming device 14, including non-transitory, volatile and non-volatile media, removable and non-removable media. The system memory 62 could include one or more image forming device readable media in the form of volatile memory, such as a random access memory (RAM) and/or a cache memory. By way of example only, the system memory 62 may be provided for reading from and writing to a non-removable, non-volatile magnetic media device typically called a "hard drive".

The system memory 62 may include at least one program product/utility 64 having a set (e.g., at least one) of program modules 66 that may be configured to carry out the functions of embodiments of the invention. The program modules 66 may include, but is not limited to, an operating system, one or more application programs, other program modules, and program data. Each of the operating systems, one or more application programs, other program modules, and program data or some combination thereof, may include an implementation of a networking environment. The program modules 66 may include procedures such as a page converter, rasterizer, compression code, page print scheduler, print engine manager, and similar printing applications (i.e., printer firmware). The program modules 66 generally carry out the functions and/or methodologies of embodiments of the invention as described herein.

The image forming device 14 may have one or more communication modules 68. The communication modules 68 may allow the image forming device 14 to communicate with one or more networks (i.e., network 16 shown in FIG. 1) such as a local area network (LAN), a general wide area network (WAN), wireless local area network (WLAN) and/or a public network. In accordance with one embodiment, the communication modules 68 may include a network communication processing unit 70A coupled to a network communication interface 70B. The network communication processing unit 70A and the network communication interface 70B may allow the image forming device 14 to communicate with one or more networks 16. These networks 16 may be a local area network (LAN), a general wide area network (WAN), a wireless local area network, a public network, a cellular network as well as other type of networks. The communication modules 68 may include a near field communication processing unit 72A coupled to a near field communication interface 72B. The near field communication processing unit 72A and the near field communication interface 72B may allow the image forming device 14 to communicate with other electronic devices located near the image forming device 14 using Bluetooth, infrared or similar wireless communication protocols.

The image forming device 14 may include an operation panel 74. The operation panel may include a display unit 76 and an input unit 78 for facilitating human interaction with the image forming device 14. The display unit 76 may be any electronic video display, such as a LCD display, LED display and similar display types. The input unit 78 may include any combination of devices that allow users to input information into the operation panel 74, such as buttons, a keyboard, switches, and/or dials. In addition, the input unit 78 may include a touch-screen digitizer overlaid onto the display unit 76 that can sense touch and interact with the display unit 76.

The image forming device 14 may have one or more sensors 79. Each sensor 79 may be used to monitor certain operating conditions of the image forming device 14. Sensors 79 may be used to indicate a location of a paper jam, document mis-feed, toner level, as well as other operating conditions. The above is given as examples and should not be read in a limiting manner. Each sensor 79 may be coupled to the processor 60. When a sensor 79 detects an operational issue as may be disclosed below, the sensor 79 may send a signal to the processor 60. The processor 60 may generate an error alert associated with the operational issue. The processor 60 may transmit the error alert to an external device as disclosed below using one of the communication modules 68.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, system memory 62) may be utilized. In the context of this disclosure, a computer readable storage medium may be any tangible or non-transitory medium that can contain, or store a program (for example, the program module 66) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Referring now to FIGS. 1-8, operation of the system 10 in accordance with one exemplary embodiment may be described. The monitoring server 12 may monitor the image forming devices 14 for a first predetermined time period. The first predetermined time period may be identified as a data sampling interval (DSI) and may be defined as a duration of time during which data is collected from the image forming device 14. For example, as may be seen in FIG. 5, the monitoring server 12 may collect data from a plurality of image forming devices 14. In the present example, the DSI is a day. However, this is just shown as an example and the DSI may be other predetermined time periods. The data collected during the DSI may be saved in a database within the monitoring server 12. Each image forming device 14 may be associated with its own historical data collected during the DSI. As may be seen in FIG. 5, for each image forming device 14 being monitored (Device 001, Model A and Device 002, Model A), the print volume and error rate is recorded and stored in a database of the monitoring server 12 for each DSI interval. It should be noted that while FIG. 5 shows print volume and error rate, other operating parameters of the image forming devices may be monitored and recorded.

Figure 6:
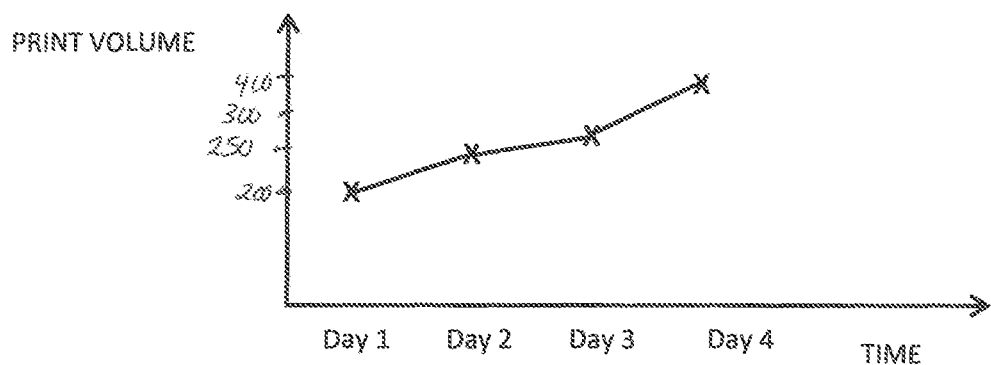
FIG. 6 is an exemplary embodiment of charts showing the data collected in FIG. 5 and showing the correlation between the data collected.
Figure 6:
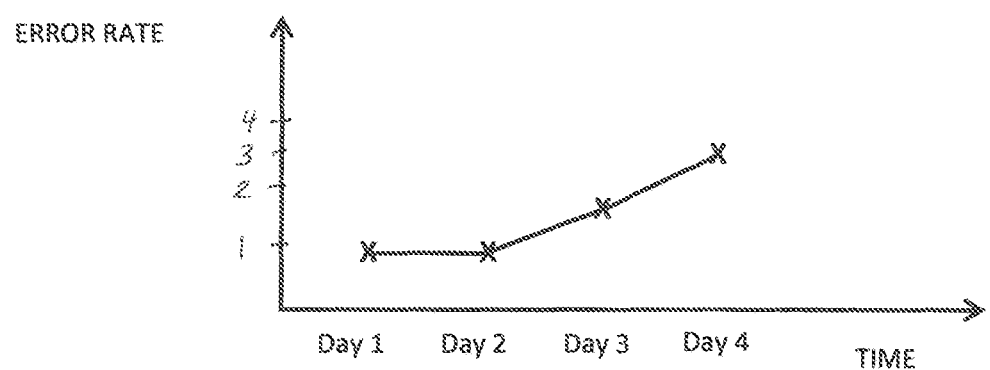

Graphs of the print volume and error rate for Device 0001, Model A may be seen in FIG. 6. As may be seen, there is a relationship between the print volume and error rate. If the image forming device has one or more parts with degradation or operating problems, then there is a tendency for the number of errors to increase with print volume. While FIG. 6 shows there is a relationship between the print volume and error rate, this should not be seen in a limiting manner. Relationships may be shown for other operating parameters of the image forming device 14 without departing from the spirit and scope of the present invention.

As disclosed above, a mathematical correlation function builds a numerical coefficient that reflects similarity of two series of variables, or measures similarity in terms of increasing and decreasing values of two variables. If the similarity is high, then the two variables are dependent. For example, if both variables increase and decrease in value synchronously, the correlation and dependency between these two variables is high. A correlation coefficient between print volume and failure rate can be an indicator of a good or bad operating status of the printing device, and it can be used as an indication of necessary service or maintenance work.

Pearson's correlation coefficient may be represented by the letter r and may be referred to as the sample correlation coefficient. So if we have one dataset $\{x_1, \ldots, x_n\}$ containing n values and another dataset $\{y_1, \ldots, y_n\}$ containing n values then that formula for r may be defined as:

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

where:
n—is the sample size
$x_i$, $y_i$—are the single samples indexed with i
$\bar{x}$—is the sample mean and analogously for $\bar{y}$ Based on the above, sample correlation coefficients may be obtained based on the relationship between the number of error alerts recorded and the print volume recorded during a sampling time frame. However, as previously stated, correlation coefficients may be obtained for other operating parameters of the image forming device 14 without departing from the spirit and scope of the present invention.

After the monitoring server 12 collects the data during the DSI, each image forming device 14 may be monitored by the monitoring server 12 during a second time interval. The second time interval may be defined as an analytical time interval (ATI). The ATI may be: a week, a month, a year, or any time frame selected. The ATI may cover a series of data sampling intervals wherein data is collected and recorded each sampling interval. The number of data samples taken during the ATI may be based on usage of each image forming device 14. For example, if the ATI is a week, the ATI may cover a typical 7 day week, i.e., Monday through Sunday, or a 5 day business week, i.e., Monday through Friday, based on image forming device 14 being monitored. Thus, if the image forming device 14 being monitored is used in a copy shop open 7 days a week, then the ATI may cover a typical 7 day week, wherein data samples are taken each day. Alternatively, if the image forming device 14 being monitored is used only during the week days, then the ATI may cover a 5 day business week, wherein data samples are taken Monday through Friday. The length of the ATI selected for the image forming device 14 may be based on the image forming device's performance, i.e., print volume and operating condition. For example, an image forming device 14 with low print volume can be associated with longer ATIs, such as every month, while image forming devices 14 with high print volumes can have shorter ATIs, such as every week.

Figure 8:
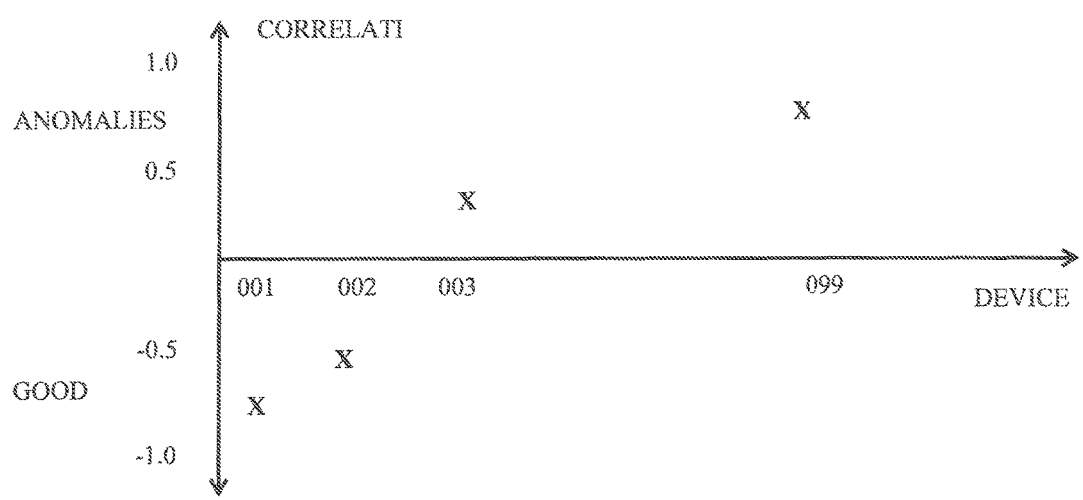
FIG. 8 is an exemplary embodiment of a chart showing the correlation coefficients calculated using the monitoring system of FIG. 1 according to one aspect of the present application.

At the end of each ATI, the monitoring server 12 may calculate and record the correlation coefficient based on the data monitored and recorded during the ATI. The correlation coefficient may be calculated as shown above based on the data obtained during the sampling intervals of the ATI. As may be seen in FIG. 7, each ATI may be associated with a device model of the image forming device 14 and a correlation coefficient calculated by the monitoring server 12. In FIG. 8, the Device 001, Model A is being monitored for three ATIs—ATI 1, ATI 2, and ATI 3. Each ATI in FIG. 6 covers 7 data sampling intervals. For each ATI, a correlation coefficient may be calculated by the monitoring server 12. The correlation coefficient calculated is based on the relationship between the number of error alerts recorded and the print volume during each ATI. The correlation coefficient calculated by the monitoring server 12 may be used to indicate a current operating status of the image forming device 14. For example, once the correlation coefficient between print volume and failure rate become positive and increases in value, the image forming device 14 may be indicating degradation of its mechanical parts.

In operation, the monitoring server 12 may monitor a plurality of image forming devices 14. Referring to FIG. 8, a plot of the correlation coefficients calculated during an ATI for each image forming devices 14 may be seen. In the present embodiment, correlation coefficients of zero (0) or below may be considered as operating in a "Good" status, while correlation coefficients of above zero (0) may be considered as operating in "Anomalies" status. While a correlation coefficient of above zero (0) may be considered as operating in "Anomalies" status, it does not necessarily mean that the monitoring server 12 requires service as this may be based on whether the correlation coefficient calculated exceeds a threshold value associated with that particular make and model of the image forming devices 14.

Observation of a trend and/or changes in the correlation coefficients during sequential ATIs may be used as a basis for diagnosing the operating status of the image forming device 14. If the correlation coefficient increases in value, it can trigger an indicator that the image forming device 14 has a certain level of degradation and the monitoring server 12 may signal the service computing device 26 to schedule maintenance work. When the correlation coefficient increases in value and exceeds a predetermined threshold, the monitoring server 12 may mark the image forming device 14 with an anomalous operating status, and the monitoring server 12 may signal the service computing device 26 to schedule immediate maintenance work. It should be noted that the monitoring server 12 may be configured to send notifications such as emails, text messages and the like with a list of image forming devices 14 that recently had a positive and high value of correlation coefficients for one or more recent analytical time intervals to the operators of the image forming devices 14 in addition to or instead of signal the service computing device 26 to schedule maintenance work. Thus, in the embodiment shown in FIG. 8, Device 003 and 099 may be listed as requiring maintenance work if the correlation coefficient calculated exceeds their respective predetermined threshold values.

The predetermined threshold level may be provided by the manufacturer and/or be customized depending on the group of users using a particular set of image forming devices 14 given the image forming devices 14 are of the same model (i.e., an office may have 10 of the same model and the users may typically be low users of the printers. The threshold may be adjusted according to the type of user/office.).

It should be noted that different ATIs can have different threshold levels. The threshold levels may be adjusted based on usage or other operating factors. For example, if the ATI includes a holiday, the threshold level may be reduced due to the period of non and/or reduced use during the holiday period.

The foregoing description is illustrative of particular embodiments of the invention, but is not meant to be a limitation upon the practice thereof. The following claims, including all equivalents thereof, are intended to define the scope of the invention.

What is claimed is:

1. A method to determine an operating status of an image forming device comprising:
   monitoring a plurality of operating parameters of the image forming device during a first time interval;
   monitoring the plurality of operating parameters of the image forming device during a second time interval, wherein the second time interval comprising a plurality of data sampling intervals;
   calculating a correlation coefficient between at least two of the plurality of operating parameters monitored during the second time interval, wherein the at least two of the operating parameters are a total number of pages printed and a total number of errors recorded by a sensor of the image forming device during the plurality of data sampling intervals of the second time interval;
   identifying the image forming device as an abnormal operating status when the correlation coefficient calculated during the second time interval is a positive correlation coefficient above a threshold level associated with a model of the image forming device; determining a maintenance action for the image forming device based on the abnormal operating status; and wherein calculating the correlation coefficient comprises using Pearson's correlation coefficient defined as:

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

wherein:
n—is the sample size
xi—is a single sample of the total number of paces printed indexed with i
yi—is a single sample of the errors recorded indexed with i
x⁻—is the sample mean for the total number of pages printed
y⁻—is the sample mean for the errors recorded.

2. The method of claim 1 wherein monitoring the plurality of operating parameters of a plurality of image forming device during the first time interval comprising monitoring the plurality of image forming devices all of a same make and model.

3. The method of claim 2, wherein monitoring the plurality of operating parameters of the plurality of image forming device during the first time interval comprises determining a total number of pages printed and a total number of errors recorded during the first time interval for each of the plurality of image forming devices.

4. The method of claim 1, comprising
monitoring the plurality of operating parameters during a plurality of second time intervals for the image forming device;
calculating correlation coefficients at an end of each of the plurality of second time intervals, wherein each correlation coefficient is calculated using the total number of pages printed and the total number of errors recorded by the sensor of the image forming device during each of the plurality of second time intervals; and
determining a maintenance action for the image forming device when a plurality of sequential correlation coefficients calculated during the plurality of second time intervals each increases in value.

5. The method of claim 1 wherein the threshold level is provided by a manufacturer of the at least one image forming device.

6. The method of claim 1 wherein the threshold level is adjustable based on usage of the at least one image forming device.

7. A method to determine an operating status of at least one image forming device comprising:
monitoring a plurality of operating parameters of the at least one image forming device during a first time interval, wherein monitoring the plurality of operating parameters of at least one image forming device comprises:
determining a total number of pages printed by the at least one image forming device during the first time interval; and
determining a total number of errors recorded by the at least one image forming device during the first time interval;
calculating a correlation coefficient of the at least one image forming device during a second time interval based on a total number of pages printed and a total number of errors recorded for the at least one image forming device during a plurality of data sampling intervals of the second time interval;
identifying the at least one image forming device as an abnormal operating status when the correlation coefficient is a positive correlation coefficient above a threshold level associated with a model of the at least one image forming device; determining a maintenance action for the image forming device based on the abnormal operating status; and
wherein calculating the correlation coefficient comprises using Pearson's correlation coefficient defined as:

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

wherein:
n—is the sample size
xi—is a single sample of the total number of pages printed indexed with i
yi—is a single sample of the errors recorded indexed with i
x⁻—is the sample mean for the total number of pages printed
y⁻—is the sample mean for the errors recorded.

8. The method claim 7 wherein the threshold level is provided by a manufacturer of the at least one image forming device.

9. The method of claim 7 wherein the threshold level is adjustable based on usage of the at least one image forming device.

10. The method of claim 7, wherein determining the total number of errors recorded during the first time interval comprises counting the total number of errors recorded by a sensor of the at least one image forming device during the first time interval.

11. The method of claim 7, wherein monitoring a plurality of operating parameters of at least one image forming device during a first time interval comprises monitoring a plurality of operating parameters of a plurality of image forming devices during the first time interval, the plurality of image forming devices all of a same make and model.

12. The method of claim 11, wherein monitoring a plurality of operating parameters of the plurality of image forming devices comprises:
determining a total number of pages printed by each of the plurality of image forming devices during the first time interval; and
determining a total number of errors recorded by each of the plurality of image forming devices during the first time interval.

13. The method of claim 7, comprising:
calculating correlation coefficients for each of a plurality of second time intervals; and
determining a maintenance action when a plurality of sequential correlation coefficients calculated during the plurality of second time intervals each increases in value.

14. The method of claim 7, comprising
calculating correlation coefficients for each of a plurality of second time intervals;
wherein the predetermined threshold level is different for each of the plurality of second time intervals.

15. A system for indicating normal and abnormal operating status for an image forming device comprising:

a processor;
a memory coupled to the processor, the memory storing program instructions that when executed by the processor, causes the processor to:
monitor a plurality of operating parameters of the image forming device during a first time interval by determining a total number of pages printed and a total number of errors recorded during the first time interval;
calculate a correlation coefficient during a second time interval based on a total number of pages printed and a total number of errors recorded by a sensor of the image forming device during a plurality of data sampling intervals of the second time interval;
identify the image forming device as an abnormal operating status when the correlation coefficient calculated during the second time interval is a positive correlation coefficient above a threshold level associated with a model of the image forming device; determine a maintenance action for the image forming device based on the abnormal operating status; and
wherein calculating the correlation coefficient comprises using Pearson's correlation coefficient defined as:

$$r = \frac{\sum_{i=1}^{n}(x_i - \bar{x})(y_i - \bar{y})}{\sqrt{\sum_{i=1}^{n}(x_i - \bar{x})^2} \sqrt{\sum_{i=1}^{n}(y_i - \bar{y})^2}}$$

wherein:
n—is the sample size
xi—is a single sample of the total number of pages printed indexed with i
yi—is a single sample of the errors recorded indexed with i
$\bar{x}$—is the sample mean for the total number of pages printed
$\bar{y}^{31}$—is the sample mean for the errors recorded.

16. The system of claim 15, wherein the memory storing program instructions that when executed by the processor, causes the processor to monitor the plurality of operating parameters of a plurality of mage forming devices, wherein the plurality of image forming devices are of a same make and model.

17. The system of claim 16, wherein the memory storing program instructions that when executed by the processor, causes the processor to:
determine a total number of pages printed by each of the plurality of image forming devices during the first time interval; and
deter mine a total number of errors recorded by each of the plurality of image forming devices during the first time interval; and
identify the image forming device as requiring maintenance when a plurality of sequential correlation coefficients calculated during a plurality of second time intervals each increases in value.

18. The system of claim 15, wherein the memory storing program instructions that when executed by the processor, causes the processor to:
calculate correlation coefficients for each of the plurality of second time intervals;
wherein the predetermined threshold level is different for each of the plurality of second time intervals.

* * * * *